US011538240B1

(12) United States Patent
Matowitz et al.

(10) Patent No.: US 11,538,240 B1
(45) Date of Patent: Dec. 27, 2022

(54) REAL PROPERTY MONITORING SYSTEMS AND METHODS

(71) Applicant: United Services Automobile Association (USAA), San Antonio, TX (US)

(72) Inventors: Theresa Marie Matowitz, San Antonio, TX (US); Michael Kyne, Saint Petersburg, FL (US); Michael Hertz, San Antonio, TX (US); Ramsey Devereaux, San Antonio, TX (US); Amber K. Buehrle, Phoenix, AZ (US); Steven Robert Seigler, Tampa, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 44 days.

(21) Appl. No.: 17/215,885

(22) Filed: Mar. 29, 2021

Related U.S. Application Data

(60) Provisional application No. 63/002,713, filed on Mar. 31, 2020.

(51) Int. Cl.
| | |
|---|---|
| *G06V 20/10* | (2022.01) |
| *G06T 7/33* | (2017.01) |
| *H04N 5/247* | (2006.01) |
| *G06Q 40/08* | (2012.01) |
| *G06V 10/75* | (2022.01) |

(52) U.S. Cl.
CPC ........... *G06V 20/176* (2022.01); *G06Q 40/08* (2013.01); *G06T 7/33* (2017.01); *G06V 10/751* (2022.01); *H04N 5/247* (2013.01); *G06T 2207/10032* (2013.01); *G06T 2207/30184* (2013.01)

(58) Field of Classification Search
CPC .... G06V 20/176; G06V 10/751; G06Q 40/08; G06T 7/33; G06T 2207/10032; G06T 2207/30184; H04N 5/247
See application file for complete search history.

(56) References Cited

U.S. PATENT DOCUMENTS

| | | | |
|---|---|---|---|
| 10,102,589 B1* | 10/2018 | Tofte | G06Q 40/00 |
| 10,535,104 B1* | 1/2020 | Mitchell | G06Q 40/08 |
| 11,227,339 B1* | 1/2022 | Devereaux | G06V 20/176 |
| 2020/0226745 A1* | 7/2020 | Adler | G06F 16/29 |
| 2021/0264525 A1* | 8/2021 | Weekes | G06Q 30/0207 |

* cited by examiner

*Primary Examiner* — Michael E Teitelbaum
(74) *Attorney, Agent, or Firm* — Fletcher Yoder P.C.

(57) ABSTRACT

Systems and methods of the present disclosure include receiving an aerial image that includes a view of property (e.g., real property, personal property, or other types of property), automatically identifying the property included in the aerial image, automatically determining one or more characteristics of the property based at least in part on the aerial image, and automatically adjusting an insurance policy term for an insurance policy relating to the property based at least in part on the one or more characteristics of the property. Certain embodiments include automatically determining the one or more characteristics of the property also based at least in part on data received from one or more smart home devices associated with the property, one or more public records relating to the property, a supplemental image accessed from a camera located in or around the property, and so forth.

18 Claims, 7 Drawing Sheets

REAL PROPERTY MONITORING SYSTEMS AND METHODS

CROSS-REFERENCE TO RELATED APPLICATION

The present disclosure is related to, and claims priority to, U.S. Provisional Patent Application Ser. No. 63/002,713, titled "Real Property Monitoring Systems and Methods," which was filed on Mar. 31, 2020, and which is herein incorporated by reference in its entirety for all purposes.

BACKGROUND

The present disclosure relates generally to determining characteristics of property, such as real property, that change over time. More specifically, the present disclosure relates to determining characteristics of property based at least in part on aerial images that are captured by cameras attached to, for example, unmanned aerial vehicles, airplanes, helicopters, or other aerial devices.

When applying for insurance on property, such as real property, prospective insured parties are often asked to provide information relating to changes that have occurred with respect to the property, such as additional square footage, installation of pools, garages, sheds, and so forth, in order to ascertain appropriate insurance rates and coverage, as well as appraisals for mortgages, inspections, home valuations, and so forth, for example. However, often, prospective insured parties may not know the extent of the information that is needed, may be mistaken as to the veracity of the information they do know, and so forth. As such, the information gathering process may not provide complete results or, even worse, may provide erroneous results.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Systems and methods of the present disclosure include receiving an aerial image that includes a view of property (e.g., real property, personal property, or other types of property), automatically identifying the property included in the aerial image, automatically determining one or more characteristics of the property based at least in part on the aerial image, and automatically adjusting an insurance policy term for an insurance policy relating to the property based at least in part on the one or more characteristics of the property. Certain embodiments include automatically determining the one or more characteristics of the property also based at least in part on data received from one or more smart home devices associated with the property, one or more public records relating to the property, a supplemental image accessed from a camera located in or around the property, and so forth. Certain embodiments also include automatically determining a recommendation relating to the property based at least in part on the aerial image, automatically determining one or more changes that have occurred to the property based at least in part on a comparison of the aerial image to another aerial image stored in an aerial image database, and so forth.

For example, certain embodiments of the present disclosure include a method that includes receiving, via a property characteristic determination system, an aerial image that includes a view of property. The method also includes identifying, via the property characteristic determination system, the property included in the aerial image. The method further includes determining, via the property characteristic determination system, one or more characteristics of the property based at least in part on the aerial image. In addition, the method includes adjusting, via the property characteristic determination system, an insurance policy term for an insurance policy relating to the property based at least in part on the one or more characteristics of the property.

In addition, certain embodiments of the present disclosure include a system that includes a camera configured to capture an aerial image that includes a view of property. The system also includes a property characteristic determination system comprising a processor configured to execute instructions that, when executed by the processor, cause the processor to identify the property included in the aerial image; determine one or more characteristics of the property based at least in part on the aerial image; and adjust an insurance policy term for an insurance policy relating to the property based at least in part on the one or more characteristics of the property.

In addition, certain embodiments of the present disclosure include a method that includes accessing, via a property characteristic determination system, a first aerial image from an aerial image database. The first aerial image includes a first view of real property. The method also includes receiving, via the property characteristic determination system, a second aerial image that includes a second view of the real property. The method further includes identifying, via the property characteristic determination system, the real property included in the first and second aerial images. In addition, the method includes determining, via the property characteristic determination system, one or more changes that have occurred to the real property based at least in part on a comparison of the first aerial image to the second aerial image. The method also includes adjusting, via the property characteristic determination system, an insurance policy term for an insurance policy relating to the real property based at least in part on the one or more changes that have occurred to the real property.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
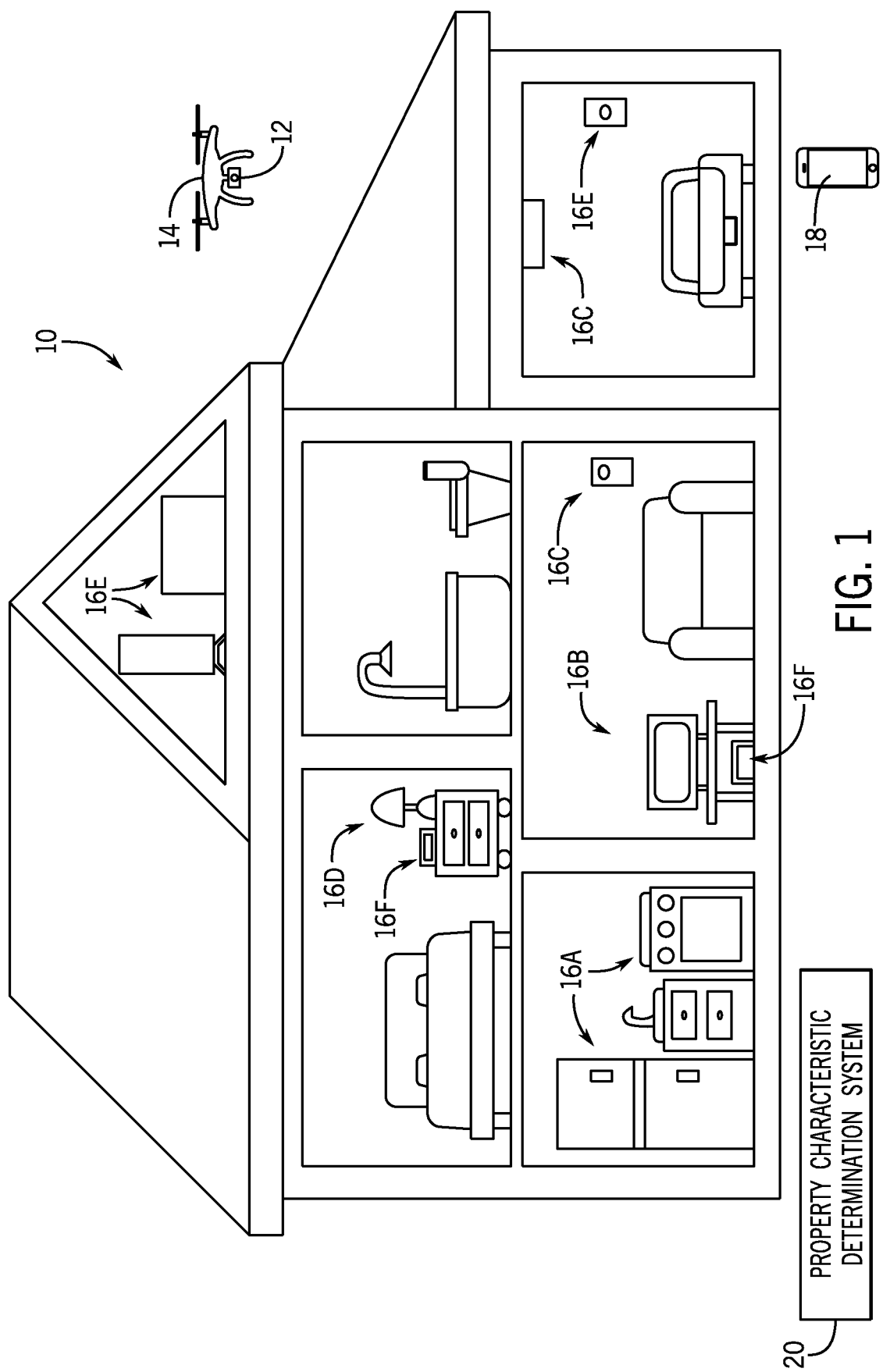
FIG. 1 illustrates property (e.g., a house) that may be illustrated in aerial images captured by one or more cameras attached to one or more aerial devices configured to fly over the property, wherein the captured aerial images may be used to determine certain characteristics about the property that change over time, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the term "insurance" may refer to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments described herein, the insurance policy is not to be understood to be limited to a residential or homeowners insurance policy, but can be for a commercial, umbrella, and other insurance policies known by those skilled in the art.

As used herein, the terms "automatic" and "automatically" may refer to actions that are performed by a computing device or computing system (e.g., of one or more computing devices) without human intervention. For example, automatically performed functions may be performed by computing devices or systems based solely on data stored on and/or received by the computing devices or systems despite the fact that no human users have prompted the computing devices or systems to perform such functions. As but one non-limiting example, the computing devices or systems may make decisions and/or initiate other functions based solely on the decisions made by the computing devices or systems, regardless of any other inputs relating to the decisions.

As used herein, the terms "real time" and substantially real time" may refer to actions that are performed substantially simultaneously with other actions, without any human-perceptible delay between the actions. For example, two functions performed in substantially real time occur within seconds (or even within milliseconds) of each other. As but one non-limiting example, two functions performed in substantially real time occur within 1 second, within 0.1 second, within 0.01 second, and so forth, of each other.

As used herein, the term "application" may refer to one or more computing modules, programs, processes, workloads, threads, and/or computing instructions executed by a computing system. Example embodiments of an application include software modules, software objects, software instances, and/or other types of executable code.

As used herein, the term "aerial image" may refer to an image of a physical location that is located at or near the surface of the Earth, which is captured from a camera that is disposed in the atmosphere above the surface of the Earth. As such, a line-of-sight of the camera capturing the aerial image may be generally orthogonal to the surface of the Earth when capturing the aerial image of the physical location. In general, the camera capturing the aerial image may be located at a relatively great distance from (e.g., over 50 feet above, over 100 feet above, over 200 feet above, over 500 feet above, over 1,000 feet above, over 2,000 feet above, over 1 mile above, or even higher above) the surface of the Earth when capturing the aerial image of the physical location.

Present embodiments are generally directed toward using aerial images to determine characteristics of property (e.g., real property, personal property, or other types of property) that are depicted in the aerial images, and using the determined characteristics of the property to automatically create and/or adjust an insurance policy term (e.g., particular type of coverage, amount of coverage, time period of coverage, premiums, exclusions, and so forth) of an insurance policy relating to the property. For example, in certain embodiments, the characteristics of the property may be determined based on a comparison of a collected aerial image to a previously collected aerial image, for example, stored in an aerial image database. In certain embodiments, the property being identified in the aerial images may include real property (e.g., land and structures integrated with or affixed to the land) such as residential real property, commercial real property, industrial real property, and so forth. However, in other embodiments, the property being identified in the aerial images may include personal property such as vehicles (e.g., cars, trucks, motorcycles, bicycles, boats, ships, airplanes, helicopters, and so forth), machinery (e.g., tractors, cultivators, planters, harvesters, and so forth), and other types of personal property. In certain embodiments, the aerial images may be collected by cameras attached to satellites, unmanned aerial vehicles, airplanes, helicopters, or other aerial devices.

In certain embodiments, the characteristics of the property may be determined based at least in part on data received from one or more smart home devices disposed in or around the property, such as smart appliances, home entertainment systems, in-home control systems, lighting devices, utility systems, portable or less portable computing devices, and so forth. For example, in certain embodiments, the one or more smart home devices may include cameras that may capture images in or around the property, which may be used to determine characteristics of the property, as described in greater detail herein. In addition, in certain embodiments, the one or more smart home devices may be specifically configured to monitor usage information, such as water usage, electricity usage, changes in temperature, and so forth, occurring at certain locations relative to the property, which may be used to correlate to particular additions that are likely to have occurred with respect to the property. In certain embodiments, the data captured by the one or more smart home devices may be used in conjunction with the aerial images to determine characteristics of the property, as described in greater detail herein. For example, if data from a smart home device is captured, which suggests that a particular property has received an addition, such as additional square footage, installation of pools, garages, sheds, and so forth (e.g., by comparison of images captured over time by the smart home device), then aerial images relating to the particular property may be accessed to confirm that the addition to the property was made, or vice versa. In certain embodiments, when both of these types of data are used, a confidence level pertaining to the determination may be automatically adjusted based on whether the two types of data appear to verify each other (i.e., positive adjustment to the confidence level) or contradict each other (i.e., negative adjustment to the confidence level).

Similarly, in certain embodiments, the characteristics of the property may be determined based at least in part on supplemental images collected from one or more other devices (e.g., such as smart phones, augmented reality (AR) glasses of goggles, other wearable computing devices, and so forth) located in or around the property. For example, in certain embodiments, the one or more devices may include cameras that may capture supplemental images in or around the property, which may be used to determine characteristics of the property, as described in greater detail herein. In certain embodiments, the data captured by the one or more devices may be used in conjunction with the aerial images to determine characteristics of the property, as described in greater detail herein. For example, if data from a device is captured, which suggests that a particular property has received an addition (e.g., by comparison of supplemental images captured over time by the device), then aerial images relating to the particular property may be accessed to confirm that the addition to the property was made, or vice versa. In certain embodiments, when both of these types of data are used, a confidence level pertaining to the determination may be automatically adjusted based on whether the two types of data appear to verify each other (i.e., positive adjustment to the confidence level) or contradict each other (i.e., negative adjustment to the confidence level).

In addition, in certain embodiments, the characteristics of the property may be determined based at least in part on data received from one or more public records relating to the property, such as public property valuation records, public property-related permits, public property tax records, public property lien and deed information (e.g., accessible via county clerk's offices), public property-related court proceedings (e.g., accessible via court websites), and so forth.

For example, in certain embodiments, one or more public records relating to the property may be accessed, and the information contained therein may be used to determine characteristics of the property, as described in greater detail herein. In certain embodiments, the data received from one or more public records may be used in conjunction with the aerial images to determine characteristics of the property, as described in greater detail herein. For example, if data from a public record suggests that a particular property is receiving an addition, then aerial images relating to the particular property may be accessed to confirm when (or if) the addition to the property has been made, or vice versa. In certain embodiments, when both of these types of data are used, a confidence level pertaining to the determination may be automatically adjusted based on whether the two types of data appear to verify each other (i.e., positive adjustment to the confidence level) or contradict each other (i.e., negative adjustment to the confidence level).

In addition, in certain embodiments, one or more recommendations relating to a particular property may be determined based at least in part on any combination of the data collected (e.g., aerial images, data collected from smart home devices, supplemental images collected by other devices, data received from public records, or some combination thereof), as described in greater detail herein, and the one or more recommendations may be automatically communicated to an owner of the particular property via, for example, an application being executed on an owner device associated with the owner. For example, in certain embodiments, the system may be configured to detect information that is locally correlative, for example, discerning that a relatively large number of homes in a local area were built by the same builder, and that the builder consistently installed shower pans (or other building components of the homes) incorrectly. As such, the system may automatically suggest changes to avoid damage from such incorrect installations. As another example, in certain embodiments, the system may detect that a particular water heater (or other building component of the property) is likely to fail relatively soon, and may automatically cause a sensor to be sent to the property so that the owner may install and use the sensor to see the status of the water heater and/or may automatically cause equipment intended to fix the problem to be sent and/or automatically send an inspector to further investigate the problem. For example, the system may automatically send a valve and/or offer to increase insurance in response to the detected problem. As another example, in certain embodiments, the system may automatically alert users that certain areas tend to have specific problems, such as foundation problems, which may allow the users to be more informed with respect to properties in the areas. As another example, in certain embodiments, the system may be configured to automatically identify potential waterline and waste backups based at least in part on collected aerial images.

By way of introduction, FIG. 1 illustrates property 10 (e.g., a house) that may be illustrated in aerial images captured by one or more cameras 12 attached to one or more aerial devices 14 configured to fly over the property 10, wherein the captured aerial images may be used to determine certain characteristics about the property 10 that change over time, as described in greater detail herein. In the illustrated embodiment, the property 10 is real property. However, as described in greater detail herein, in other embodiments, the property 10 may instead be personal property or other types of property. In addition, in the illustrated embodiment, the aerial device 14 is an unmanned aerial vehicle (UAV) such as a drone. However, as described in greater detail herein, in other embodiments, the aerial devices 14 may instead be satellites, airplanes, helicopters, or other aerial devices. As described in greater detail herein, the one or more cameras 12 of the aerial devices 14 are configured to automatically capture aerial images, independent of the particular properties 10 of which the one or more cameras 12 are taking aerial images. Rather, for example, the aerial devices 14 may be configured to maneuver about particular geographical areas without any particular targets in mind, but simply to survey the geographical areas to automatically capture aerial images of all properties 10 located within the geographical areas. However, in other embodiments, a property characteristic determination system 20 described herein may send control signals to the aerial devices 14 to command the aerial devices 14 to maneuver their respective cameras 12 over particular properties 10 of interest. Regardless, in certain embodiments, the particular aerial images captured by the one or more cameras 12 are captured without any particular human intervention.

In addition, as also described in greater detail herein, one or more smart home devices 16 disposed within (or proximate to) the property 10 may also be configured to collect data that may be used to determine certain characteristics about the property 10, as described in greater detail herein. As described in greater detail herein, the one or more smart home devices 16 are configured to automatically collect data at various time intervals, independent of any particular human intervention. As illustrated in FIG. 1, in certain embodiments, the smart home devices 16 may include, but are not limited to, one or more of the following:

smart appliances 16A, such as washers, dryers, refrigerators, ovens, dishwashers, and so forth;
home entertainment systems 16B, such as televisions, audio systems, game consoles, media players, and so forth;
in-home control systems 16C, such as garage door openers, alarm systems, security systems (e.g., security lights, security cameras, locks, and so forth), safety systems (e.g., smoke detectors, carbon monoxide detectors, and so forth), and other smart home systems (e.g., windows, chimney flues, and so forth);
lighting devices 16D, such as lamps, fixtures, and so forth;
utility systems 16E that provide and/or control electric power, natural gas, water, sewage, heating, ventilation, and air conditioning (HVAC), network access, and so forth, such as HVAC units, thermostats, vents, water meters, water heaters, gas meters, electrical switch boxes, circuit breaker boxes, and so forth; and/or
portable or less portable computing devices 16F, such as smart phones, tablet computers, electronic book readers, laptop computers, desktop computers, wearable computing devices, television set-top boxes, in-vehicle automotive computers or telematics devices, and so forth.

As also illustrated in FIG. 1, in certain embodiments, one or more user computing devices 18, such as personal computers, laptop computers, tablet computers, smart phones, AR glasses or goggles, other wearable computing devices, and so forth, may also be configured to collect data (e.g., supplemental images captured within or around the property 10) that may be used to determine certain characteristics about the property 10, as described in greater detail herein. As described in greater detail herein, the one or more user computing devices 18 are configured to automatically collect data at various time intervals, independent of any particular human intervention.

Each of the types of devices 12, 16, 18 illustrated in FIG. 1 are configured to automatically communicate data (e.g., aerial images, supplemental images, and other types of data) to a property characteristic determination system 20 to enable the property characteristic determination system 20 to automatically determine one or more characteristics of one or more properties 10, as described in greater detail herein. Furthermore, as described in greater detail herein, in certain embodiments, the determined characteristics of the one or more properties 10 may be used by the property characteristic determination system 20 to automatically create and/or adjust insurance policy terms (e.g., particular types of coverage, amounts of coverage, periods of coverage, premiums, exclusions, and so forth) of insurance policies relating to the one or more properties 10. Alternatively, or in addition to, in certain embodiments, the determined characteristics of the one or more properties 10 may be used by the property characteristic determination system 20 to automatically determine other things related to the one or more properties 10 including, but not limited to, appraisals for mortgages relating to the one or more properties 10, inspections and/or home valuations relating to the one or more properties 10 (e.g., for banks, tax offices, and so forth), recommendations relating to the one or more properties 10, and so forth.

In general, the ability of the property characteristic determination system 20 to actively and automatically monitor property 10 for changes enables quicker identification required to provide each of these services to property owners. In addition, in certain embodiments, the property characteristic determination system 20 may take other information into consideration, such as builder information relating to property 10, information about property owners (e.g., risk tolerance), environmental conditions in the area of property 10, legal data (e.g., state law and level of litigation in the area of property 10), neighborhood conditions for the property 10 (e.g., weather, local vegetation, crime, and so forth), and so forth, to evaluate and identify, for example, insurance coverage needs (e.g., gaps in insurance coverage). For example, in certain embodiments, the property characteristic determination system 20 may take into account climate change effects (e.g., disappearing shorelines) and predict the effect on beach property 10, for example. This allows for guided personalization based on these factors, including things like buying habits, risk tolerance, occupancy (e.g., who is in the home), lifestyle, and so forth.

Figure 2:
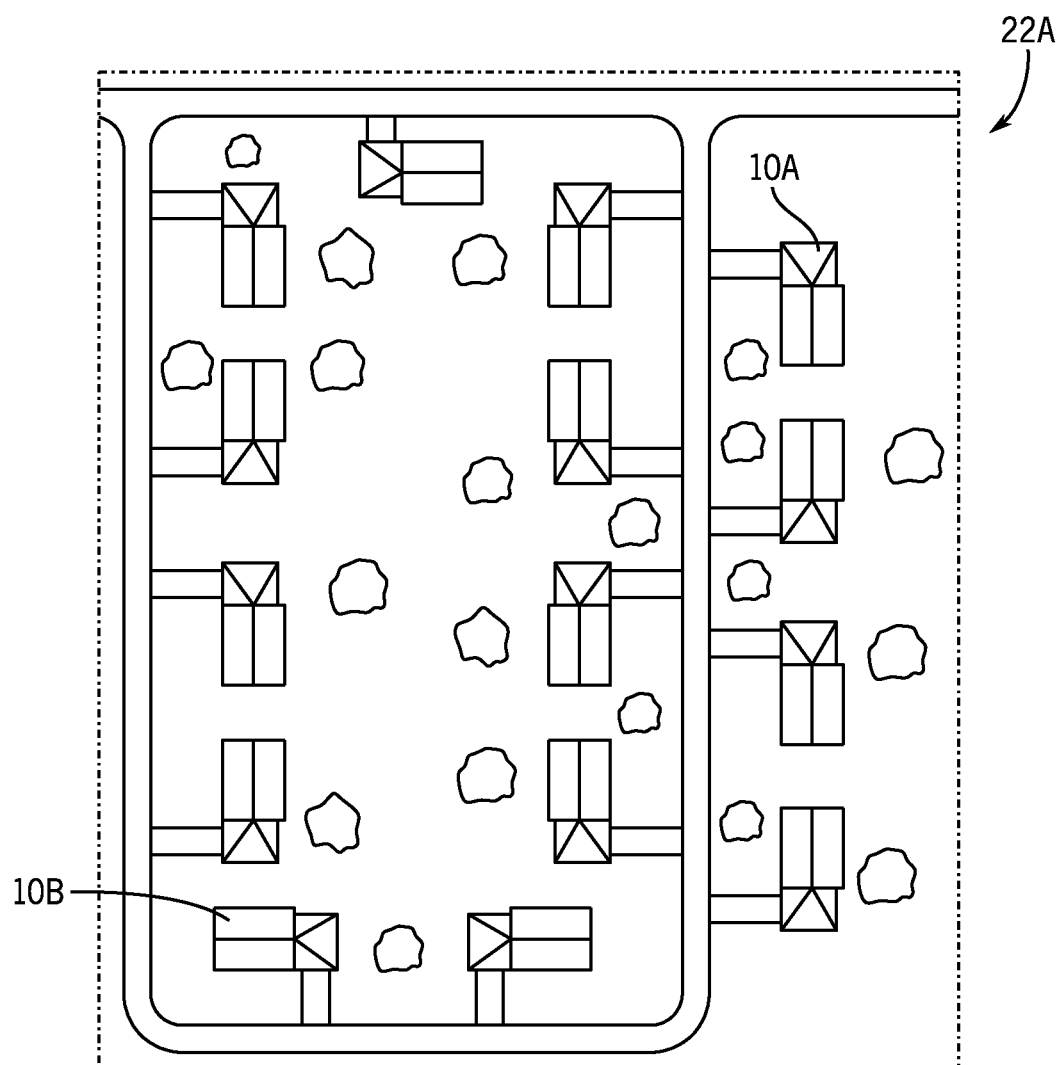
FIG. 2 is a first aerial image taken at a first time, in accordance with embodiments described herein.
Figure 3:
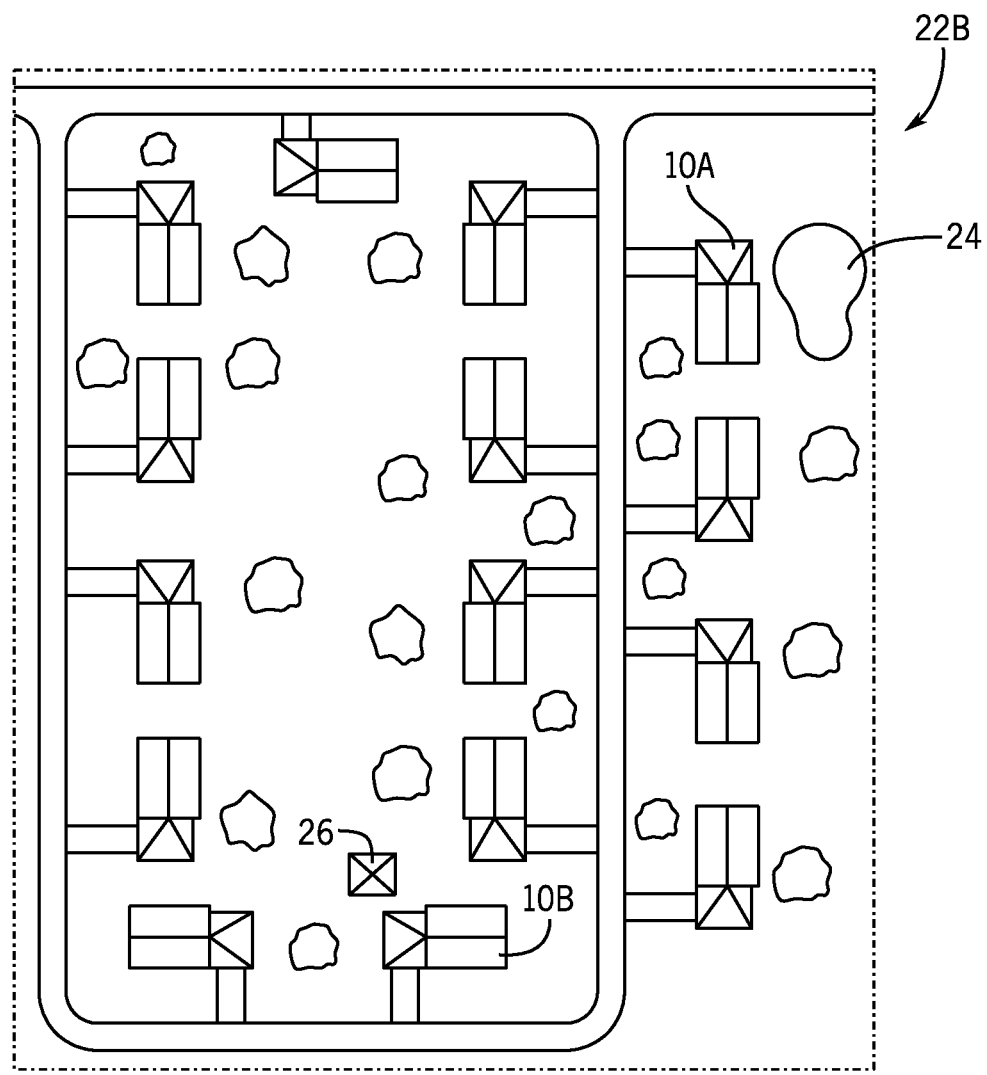
FIG. 3 is a second aerial image taken at a second, subsequent time, in accordance with embodiments described herein.

FIGS. 2 and 3 help illustrate how the property characteristic determination system 20 may use aerial images captured by one or more cameras 12 attached to one or more aerial devices 14 flying over one or more properties 10, as described in greater detail herein. In particular, FIG. 2 is a first aerial image 22A taken at a first time and FIG. 3 is a second aerial image 22B taken at a second, subsequent time. As illustrated, the first and second aerial images 22A, 22B generally correspond to a same set of properties 10 (e.g., houses) such that differences between the two aerial images 22A, 22B may be determined, which may correspond to particular characteristics relating to particular properties 10. For example, as illustrated in FIG. 3, the second aerial image 22B depicts a first property 10A that includes a swimming pool 24 that is not depicted in the first aerial image 22A illustrated in FIG. 2, and depicts a second property 10B that includes a shed 26 that is not depicted in the first aerial image 22A illustrated in FIG. 2. As described in greater detail herein, in certain embodiments, the property characteristic determination system 20 may automatically compare the two aerial images 22A, 22B to identify the differences between the two aerial images 22A, 22B, may automatically identify the additions to the first and second properties 10A, 10B (e.g., the addition of the swimming pool 24 to the first property 10A and the addition of the shed 26 to the second property 10B), and may automatically create and/or adjust insurance policy terms (e.g., particular types of coverage, amounts of coverage, periods of coverage, premiums, exclusions, and so forth) of insurance policies relating to the properties 10A, 10B based at least in part on the identified additions.

In certain embodiments, analyzing the two aerial images 22A, 22B may include automatically registering like locations within the aerial images 22A, 22B, for example, based on common physical features and/or sets of physical features captured in the aerial images 22A, 22B and, if needed, rotating, zooming in or out, cropping, and/or stretching or shrinking (e.g., in one or more directions) the aerial images 22A, 22B to account for differences in perspective between the aerial images 22A, 22B. As such, the aerial images 22A, 22B may be automatically converted into formats that align physical features captured in the aerial images 22A, 22B. In addition, in certain embodiments, certain noise (e.g., superfluous physical features or just extraneous data) captured by the aerial images 22A, 22B may be automatically filtered out such that only potentially relevant physical features remain in the aerial images 22A, 22B.

Once the aerial images 22A, 22B have been automatically converted and filtered, the aerial images 22A, 22B may be compared to automatically identify characteristics of the properties 10A, 10B captured by the aerial images 22A, 22B. For example, in certain embodiments, the aerial images 22A, 22B may be compared to identify certain physical features in the aerial images 22A, 22B on a pixel-by-pixel manner to automatically identify certain patterns that appear in both aerial images 22A, 22B, wherein the patterns appear to form a particular property 10A, 10B when combined together. In addition, to more particularly identify the particular property 10A, 10B, in certain embodiments, the particular property 10A, 10B may be automatically correlated to a particular physical address based, for example, on a comparison of geolocations associated with the aerial images 22A, 22B and geolocations of particular properties 10A, 10B stored in public records 48 or an aerial image database 46, for example.

As described in greater detail herein, once the properties 10A, 10B have been automatically identified, changes relating to one or more characteristics for the properties 10A, 10B that occurred between the first aerial image 22A and the second aerial image 22B may be automatically determined based on the identification of added (or removed) patterns of certain physical features between the aerial images 22A, 22B. Similar to the identification of the properties 10A, 10B themselves, the patterns of physical features that have been added (or removed) between the aerial images 22A, 22B may be automatically compared to similar features stored, for example, in the aerial image database 46 or other database to automatically identify a type of the addition (or removal), for example, the addition of a pool 24, the addition of a shed 26, and so forth.

Figure 4:
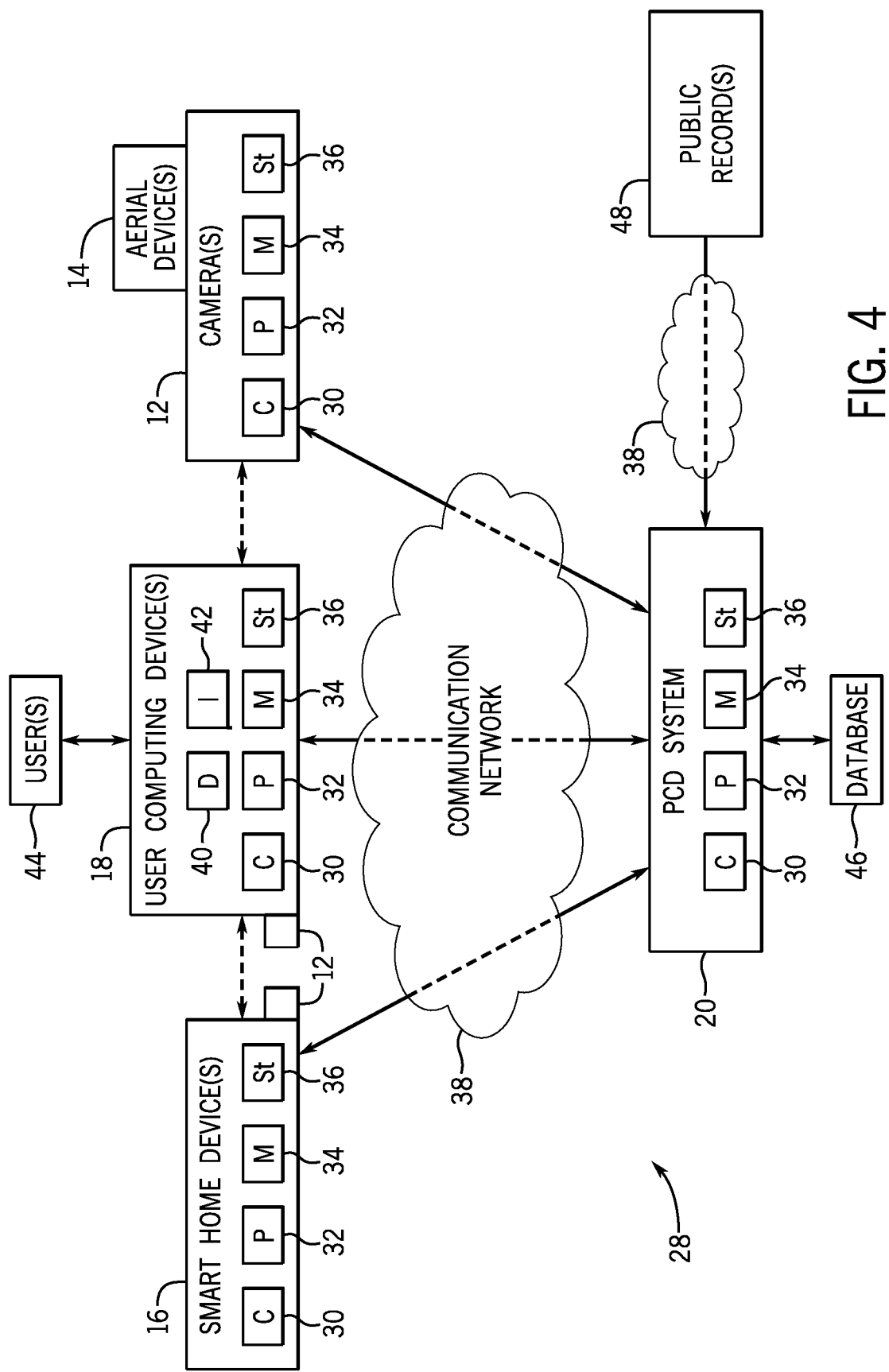
FIG. 4 is a block diagram of a system that may be configured to utilize aerial images of property, among other collected data, to determine characteristics of the property that change over time, in accordance with embodiments described herein.

FIG. 4 is a block diagram of a system 28 that may be configured to utilize aerial images 22 of property 10, among other collected data, to determine characteristics of the property 10 change over time. In certain embodiments, the system 28 may include the property characteristic determination system 20 described in greater detail herein. In particular, in certain embodiments, the property characteristic determination system 20 may include certain processing circuitry configured to automatically determine characteristics of the property 10, as described in greater detail herein. For example, in certain embodiments, the property characteristic determination system 20 may include at least one communication component 30, at least one processor 32, at least one memory medium 34, and at least one storage device 36, or any of a variety of other processing circuitry that enable the property characteristic determination system 20 to determine characteristics of the property 10, as described in greater detail herein.

In certain embodiments, the communication component(s) 30 of the property characteristic determination system 20 may be wireless or wired communication components that may facilitate communication with one or more cameras 12 that capture aerial images 22 of property 10, one or more smart home devices 16 associated with property 10, one or more user computing devices 18, and other devices or systems via a wireless or wired communication network 38. For example, in certain embodiments, the property characteristic determination system 20 may communicate with one or more cameras 12 that capture aerial images 22 of property 10, one or more smart home devices 16 associated with property 10, one or more user computing devices 18, and other devices or systems via Wi-Fi, near field communication, Bluetooth, Zigbee, radio frequency identification (RFID) tags and/or readers, an embedded wireless module, and/or another suitable wired or wireless communication network 38.

In certain embodiments, the processor(s) 32 of the property characteristic determination system 20 may be any suitable type of computer processors or microprocessors capable of executing computer-executable code. In certain embodiments, the memory media 34 and the storage device(s) 36 of the property characteristic determination system 20 may be any suitable articles of manufacture that can serve as media to store processor-executable code, data, or the like. These articles of manufacture may represent computer-readable media (e.g., any suitable form of memory or storage) that may store the processor-executable code executed by the processor(s) 32 to perform the presently disclosed techniques. In certain embodiments, the memory media 34 and the storage device(s) 36 of the property characteristic determination system 20 may also be used to store data, various other software applications, and the like. In certain embodiments, the memory media 34 and the storage device(s) 36 of the property characteristic determination system 20 may represent non-transitory computer-readable media (e.g., any suitable form of memory or storage) that may store the processor-executable code used by the processor(s) 32 to perform various techniques described herein. It should be noted that non-transitory merely indicates that the media is tangible and not a signal. It should be noted that the components described above with regard to the property characteristic determination system 20 are exemplary components, and the property characteristic determination system 20 may include additional or fewer components in certain embodiments.

Additionally, in certain embodiments, the cameras 12 that capture aerial images 22 of property 10, the smart home devices 16 associated with property 10, and the user computing devices 18 described herein may also include similar components as described as part of the property characteristic determination system 20 (e.g., respective communication component(s) 30, processor(s) 32, memory media 34, storage device(s) 36, and so forth). In addition, in certain embodiments, the user computing device(s) 18 described herein may also include a display 40 and at least one input device 42, which may facilitate a user 44 viewing information generated by the property characteristic determination system 20 (e.g., automatic creation and/or adjustment of insurance policy terms of an insurance policy relating to property 10 owned by the user 44, recommendations relating to property 10 owned by the user 44, and so forth) and inputting data that may be used by the property characteristic determination system 20, respectively, as described in greater detail herein.

As described in greater detail herein, the processor-executable code executed by the processor(s) 32 of the property characteristic determination system 20 may cause the communication component(s) 30 of the property characteristic determination system 20 to automatically receive aerial image(s) 22 from camera(s) 12, may automatically determine characteristics of property 10 (e.g., real property, personal property, or other types of property) that are depicted in the aerial images 22, and may use the determined characteristics of the property 10 to automatically create and/or automatically adjust an insurance policy term (e.g., particular type of coverage, amount of coverage, time period of coverage, premiums, exclusions, and so forth) of an insurance policy relating to the property 10. For example, in certain embodiments, the characteristics of the property 10 may be automatically determined by the property characteristic determination system 20 based on a comparison of a collected aerial image 22 to a previously collected aerial image 22, for example, stored in an aerial image database 46. As described in greater detail herein, in certain embodiments, the property characteristic determination system 20 may be configured to automatically notify an owner 44 of the property 10 when a creation and/or adjustment to an insurance policy term is made by, for example, automatically sending a notification to an application being executed on a user computing device 18 associated with the owner 44.

As described in greater detail herein, in certain embodiments, the property 10 being identified in the aerial images 22 may include real property (e.g., land and structures integrated with or affixed to the land) such as residential real property, commercial real property, industrial real property, and so forth. However, in other embodiments, the property 10 being identified in the aerial images 22 may include personal property such as vehicles (e.g., cars, trucks, motorcycles, bicycles, boats, ships, airplanes, helicopters, and so forth), machinery (e.g., tractors, cultivators, planters, harvesters, and so forth), and other types of personal property. As also described in greater detail herein, in certain embodiments, the aerial images 22 may be collected by aerial cameras 12 attached to aerial devices 14 such as satellites, unmanned aerial vehicles, airplanes, helicopters, or other aerial devices.

As described in greater detail herein, in certain embodiments, the characteristics of the property may be automatically determined by the property characteristic determination system 20 based at least in part on data received from one or more smart home devices 16 disposed in or around the property 10, such as smart appliances, home entertainment systems, in-home control systems, lighting devices, utility systems, portable or less portable computing devices, and so forth. For example, in certain embodiments, the one or more smart home devices 16 may also include cameras 12 that may automatically capture images in or around the property, which may be used by the property characteristic determination system 20 to automatically determine characteristics of the property 10, as described in greater detail herein. In addition, in certain embodiments, the one or more smart home devices 16 may be specifically configured to automatically monitor usage information, such as water usage, electricity usage, changes in temperature, and so forth, occurring at certain locations relative to the property 10, which may be used by the property characteristic determination system 20 to correlate to particular additions that are likely to have occurred (e.g., based on the analysis of the aerial images 22). In certain embodiments, the data captured by the one or more smart home devices 16 may be used in conjunction with the aerial images 22 by the property characteristic determination system 20 to automatically determine characteristics of the property 10, as described in greater detail herein. For example, if data from a smart home device 16 is captured, which suggests that a particular property 10 has received an addition (e.g., by comparison of images captured over time by the smart home device 16), then aerial images 22 relating to the particular property 10 may be automatically accessed by the property characteristic determination system 20 to confirm that the addition to the property 10 was made, or vice versa. In certain embodiments, when both of these types of data are used, a confidence level pertaining to the determination may be automatically adjusted by the property characteristic determination system 20 based on whether the two types of data appear to verify each other (i.e., positive adjustment to the confidence level) or contradict each other (i.e., negative adjustment to the confidence level).

Similarly, in certain embodiments, the characteristics of the property 10 may be automatically determined by the property characteristic determination system 20 based at least in part on supplemental images collected from one or more other user computing devices 18 (e.g., such as smart phones, augmented reality (AR) glasses of goggles, other wearable computing devices, and so forth) located in or around the property 10. For example, in certain embodiments, the one or more user computing devices 18 may also include cameras 12 that may capture supplemental images in or around the property 10, which may be used by the property characteristic determination system 20 to automatically determine characteristics of the property 10, as described in greater detail herein. In certain embodiments, the data captured by the one or more user computing devices 18 may be used in conjunction with the aerial images 22 by the property characteristic determination system 20 to automatically determine characteristics of the property 10, as described in greater detail herein. For example, if data from a user computing device 18 is captured, which suggests that a particular property 10 has received an addition (e.g., by comparison of supplemental images captured over time by the computing device 18), then aerial images 22 relating to the particular property 10 may be automatically accessed by the property characteristic determination system 20 to confirm that the addition to the property 10 was made, or vice versa. In certain embodiments, when both of these types of data are used, a confidence level pertaining to the determination may be automatically adjusted by the property characteristic determination system 20 based on whether the two types of data appear to verify each other (i.e., positive adjustment to the confidence level) or contradict each other (i.e., negative adjustment to the confidence level).

In addition, in certain embodiments, the characteristics of the property 10 may be determined by the property characteristic determination system 20 based at least in part on data automatically received from one or more public records 48 relating to the property 10, such as public property valuation records, public property-related permits, public property tax records, public property lien and deed information (e.g., accessible via county clerk's offices), public property-related court proceedings (e.g., accessible via court websites), and so forth. For example, in certain embodiments, one or more public records 48 relating to the property 10 may be automatically accessed by the property characteristic determination system 20 via the communication network 38, and the information contained therein may be used by the property characteristic determination system 20 to automatically determine characteristics of the property 10, as described in greater detail herein. In certain embodiments, the data received from one or more public records 48 may be used in conjunction with the aerial images 22 by the property characteristic determination system 20 to determine characteristics of the property 10, as described in greater detail herein. For example, if data from a public record 48 suggests that a particular property 10 is receiving an addition, then aerial images 22 relating to the particular property 10 may be automatically accessed by the property characteristic determination system 20 to confirm when (or if) the addition to the property 10 has been made, or vice versa. In certain embodiments, when both of these types of data are used, a confidence level pertaining to the determination may be automatically adjusted by the property characteristic determination system 20 based on whether the two types of data appear to verify each other (i.e., positive adjustment to the confidence level) or contradict each other (i.e., negative adjustment to the confidence level).

In addition, in certain embodiments, one or more recommendations relating to a particular property 10 may be automatically determined by the property characteristic determination system 20 based at least in part on any combination of the data collected (e.g., aerial images 22, data collected from smart home devices 16, supplemental images collected by other user computing devices 18, data received from public records 48, or some combination thereof), as described in greater detail herein, and the one or more recommendations may be automatically communicated to an owner 44 of the particular property 10 via, for example, an application being executed on a user computing device 18 associated with the owner 44. For example, in certain embodiments, the property characteristic determination system 20 may be configured to automatically detect information that is locally correlative, for example, discerning that a relatively large number of homes in a local area were built by the same builder, and that the builder consistently installed shower pans (or other building components of the property 10) incorrectly. As such, the property characteristic determination system 20 may automatically suggest changes to avoid damage from such incorrect installations. As another example, in certain embodiments, the property characteristic determination system 20 may automatically detect that a particular water heater (or other building component of the property 10) is likely to fail relatively soon, and may automatically cause a sensor to be sent to the property 10 so that the owner 44 may install and use the sensor to see the status of the water heater and/or may automatically cause equipment intended to fix the problem to be sent and/or send an inspector to further investigate the problem. For example, the property characteristic determination system 20 may automatically send a valve and/or offer to increase insurance in response to the detected problem. As another example, in certain embodiments, the property characteristic determination system 20 may automatically alert users 44 that certain areas tend to have specific problems, such as foundation problems, which may allow the users to be more informed with respect to properties 10 in the areas. As another example, in certain embodiments, the property characteristic determination system 20 may be configured to automatically identify potential waterline and waste backups based at least in part on collected aerial images 22. As described in greater detail herein, in certain embodiments, the property characteristic determination system 20 may be configured to automatically notify an owner 44 of the property 10 of these types of recommendations by, for example, automatically sending a notification to an application being executed on a user computing device 18 associated with the owner 44.

Figure 5:
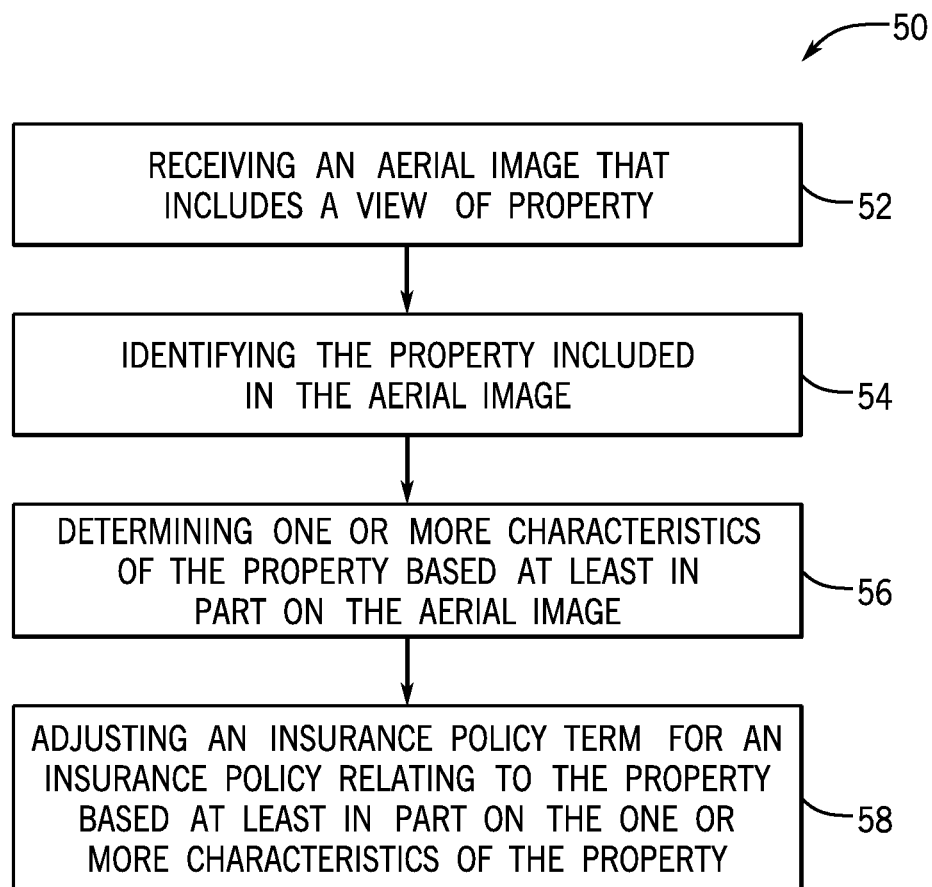
FIG. 5 is a flow diagram of a method of operating a property characteristic determination system, in accordance with embodiments described herein.

FIG. 5 is a flow diagram of a method 50 of operating the property characteristic determination system 20 described herein. As illustrated in FIG. 5, in certain embodiments, the method 50 includes receiving, via the property characteristic determination system 20, an aerial image 22 that includes a view of property 10 (block 52). In addition, in certain embodiments, the method 50 includes automatically identifying, via the property characteristic determination system 20, the property 10 included in the aerial image 22 (block 54). In addition, in certain embodiments, the method 50 includes automatically determining, via the property characteristic determination system 20, one or more characteristics of the property 10 based at least in part on the aerial image 22 (block 56). In addition, in certain embodiments, the method 50 includes automatically adjusting, via the property characteristic determination system 20, an insurance policy term for an insurance policy relating to the property 10 based at least in part on the one or more characteristics of the property 10 (block 58).

Figure 6:
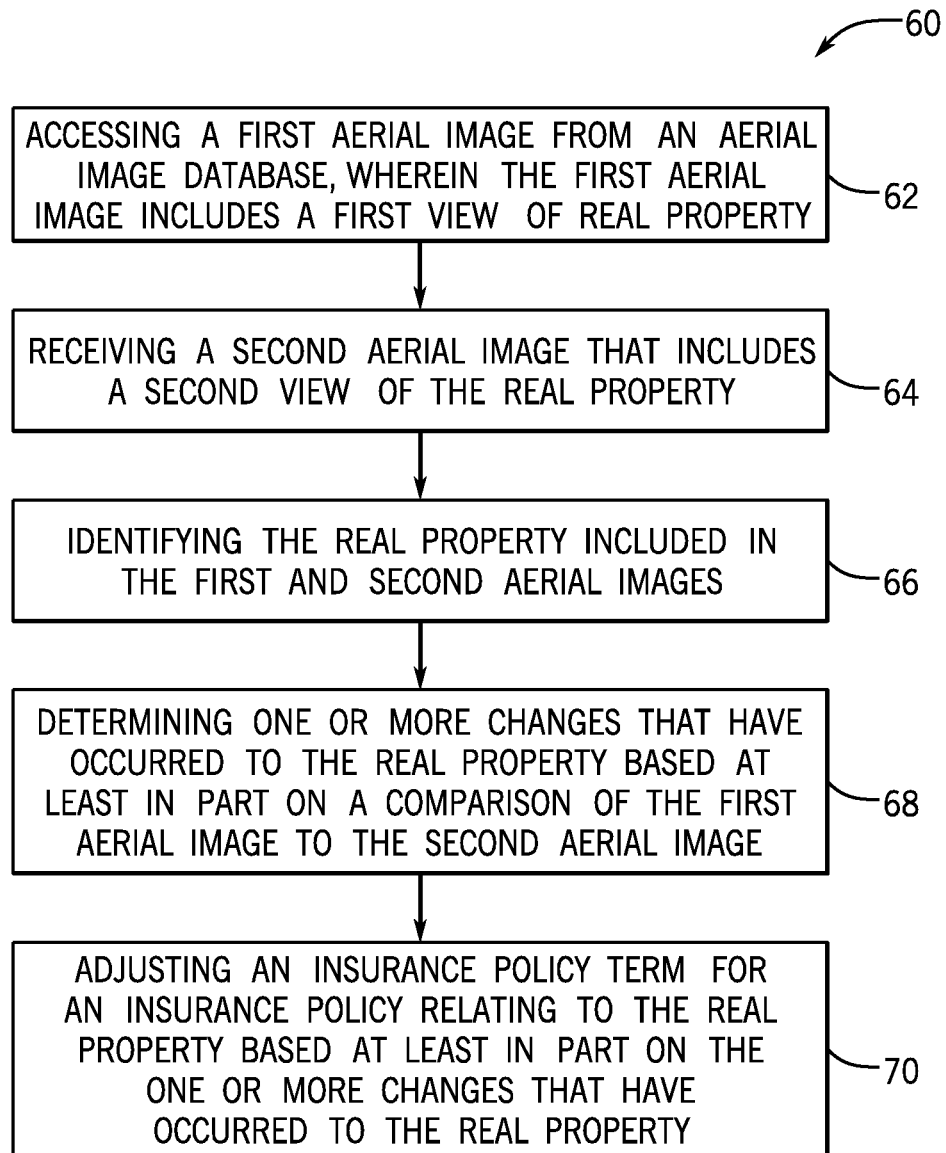
FIG. 6 is a flow diagram of another method of operating the property characteristic determination system, in accordance with embodiments described herein.

FIG. 6 is a flow diagram of another method 60 of operating the property characteristic determination system 20 described herein. As illustrated in FIG. 6, in certain embodiments, the method 60 includes accessing, via the property characteristic determination system 20, a first aerial image 22 from an aerial image database 46, wherein the first aerial image 22 includes a first view of real property 10 (block 62). In addition, in certain embodiments, the method 60 includes automatically receiving, via the property characteristic determination system 20, a second aerial image 22 that includes a second view of the real property 10 (block 64). In addition, in certain embodiments, the method 60 includes automatically identifying, via the property characteristic determination system 20, the real property 10 included in the first and second aerial images 22 (block 66). In addition, in certain embodiments, the method 60 includes automatically determining, via the property characteristic determination system 20, one or more changes that have occurred to the real property 10 based at least in part on a comparison of the first aerial image 22 to the second aerial image 22 (block 68). In addition, in certain embodiments, the method 60 includes automatically adjusting, via the property characteristic determination system 20, an insurance policy term for an insurance policy relating to the real property 10 based at least in part on the one or more changes that have occurred to the real property 10 (block 70).

Figure 7:
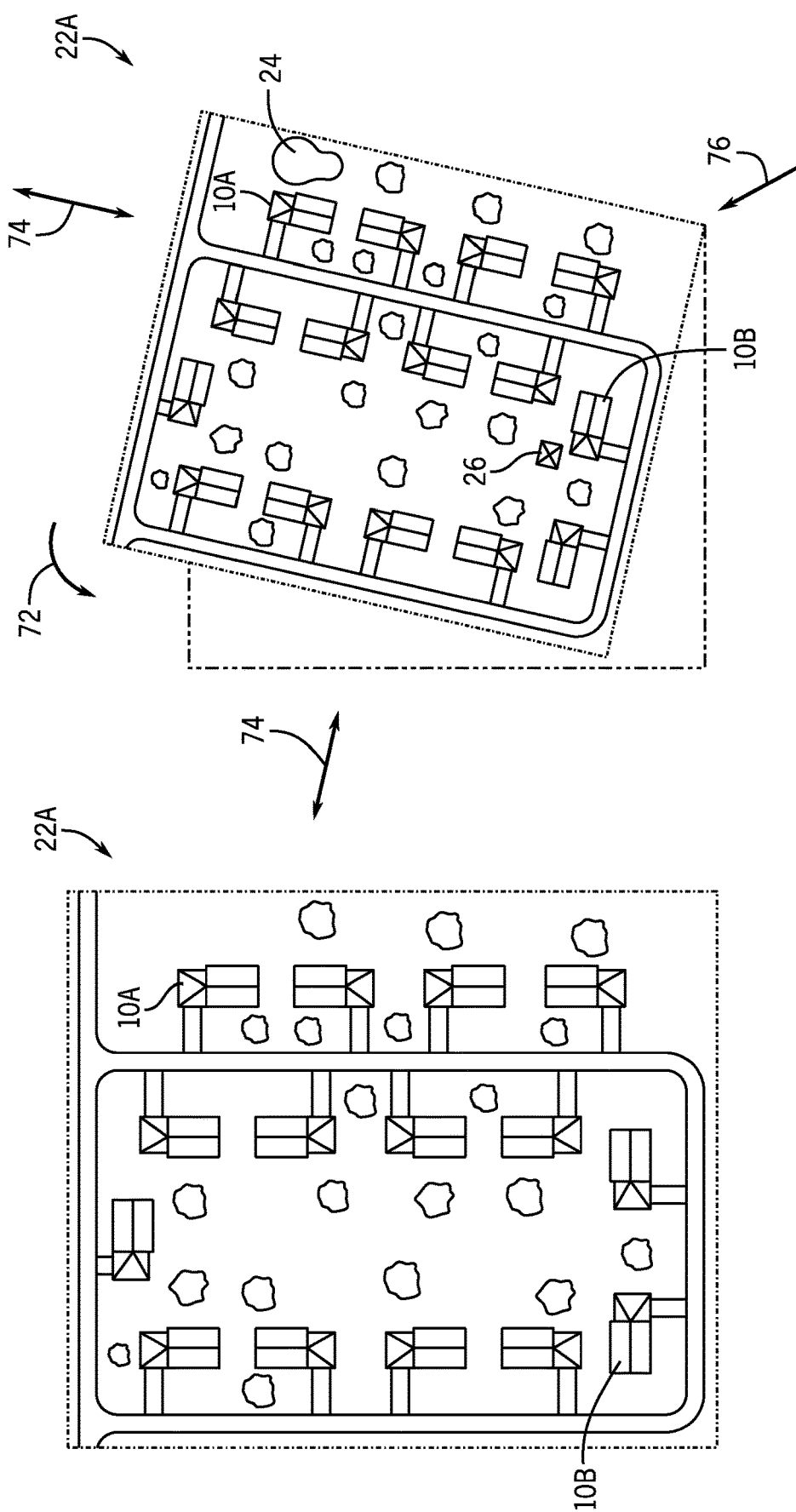
FIG. 7 illustrates how a first aerial image may be manipulated to align with a second aerial image, in accordance with embodiments described herein.

In addition, as described above, in certain embodiments, automatically identifying, via the property characteristic determination system 20, the real property 10 included in the first and second aerial images 22 may include automatically registering like locations within the aerial images 22, for example, based on common physical features and/or sets of physical features captured in the aerial images 22. For example, as illustrated in FIG. 7, in certain embodiments, one or both of two aerial images 22A, 22B may be rotated 72, zoomed in or out 74, cropped, and/or stretched or shrunk 76 (e.g., in one or more directions), via the property characteristic determination system 20, to account for differences in perspective between the aerial images 22A, 22B. As such, the aerial images 22A, 22B may be automatically converted into formats that align physical features (e.g., of properties 10A, 10B, among other identified physical features) captured in the aerial images 22A, 22B. In addition, in certain embodiments, certain noise (e.g., superfluous physical features or just extraneous data) captured by the aerial images 22A, 22B may be automatically filtered out, via the property characteristic determination system 20, such that only potentially relevant physical features remain in the aerial images 22A, 22B.

Once the aerial images 22A, 22B have been automatically converted and filtered, the aerial images 22A, 22B may be compared, via the property characteristic determination system 20, to automatically identify characteristics of the properties 10A, 10B captured by the aerial images 22A, 22B. For example, in certain embodiments, the aerial images 22A, 22B may be compared, via the property characteristic determination system 20, to automatically identify certain physical features in the aerial images 22A, 22B on a pixel-by-pixel manner to identify certain patterns that appear in both aerial images 22A, 22B, wherein the patterns appear to form a particular property 10A, 10B when combined together. In addition, to more particularly identify the particular property 10A, 10B, in certain embodiments, the particular property 10A, 10B may be automatically correlated, via the property characteristic determination system 20, to a particular physical address based, for example, on a comparison of geolocations associated with the aerial images 22A, 22B and geolocations of particular properties 10A, 10B stored in public records 48 or an aerial image database 46, for example.

As described in greater detail herein, once the properties 10A, 10B have been automatically identified by the property characteristic determination system 20, changes relating to one or more characteristics for the properties 10A, 10B that occurred between the first aerial image 22A and the second aerial image 22B may be automatically determined, via the property characteristic determination system 20, based on the identification of added (or removed) patterns of certain physical features between the aerial images 22A, 22B. Similar to the identification of the properties 10A, 10B themselves, the patterns of physical features that have been added (or removed) between the aerial images 22A, 22B may be automatically compared, via the property characteristic determination system 20, to similar features stored, for example, in the aerial image database 46 or other database to automatically identify a type of the addition (or removal), for example, the addition of a pool 24, the addition of a shed 26, and so forth.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A method, comprising:
receiving, via a property characteristic determination system, a first aerial image that includes a view of a real estate property;
identifying, via the property characteristic determination system, the real estate property included in the first aerial image;
accessing, via the property characteristic determination system, a second aerial image from an aerial image database;
formatting, via the property characteristic determination system, the first aerial image or the second aerial image to align one or more physical features captured by the first aerial image and the second aerial image, wherein formatting the first aerial image or the second aerial image comprises automatically filtering noise from the first aerial image or the second aerial image to facilitate alignment of the one or more physical features captured by the first aerial image and the second aerial image;
determining, via the property characteristic determination system, one or more changes that have occurred to the real estate property based at least in part on a comparison of the first aerial image to the second aerial image; and
automatically adjusting, via the property characteristic determination system, an insurance policy term for an insurance policy relating to the real estate property based at least in part on the one or more changes that have occurred to the real estate property.

2. The method of claim 1, comprising:
receiving, via the property characteristic determination system, data relating to one or more characteristics of the real estate property from one or more smart home devices associated with the real estate property; and
determining, via the property characteristic determination system, the one or more changes that have occurred to the real estate property based at least in part on the data relating to the one or more characteristics.

3. The method of claim 1, comprising:
accessing, via the property characteristic determination system, data relating to one or more public records relating to the real estate property; and
determining, via the property characteristic determination system, the one or more changes that have occurred to the real estate property based at least in part on the data relating to the one or more public records relating to the real estate property.

4. The method of claim 1, comprising:
accessing, via the property characteristic determination system, a supplemental image from a camera located in or around the real estate property; and
determining, via the property characteristic determination system, the one or more changes that have occurred to the real estate property based at least in part on the supplemental image.

5. The method of claim 1, comprising:
determining, via the property characteristic determination system, a recommendation relating to the real estate property based at least in part on the first aerial image or the second aerial image; and
communicating, via the property characteristic determination system, the recommendation to an owner of the real estate property via provision of instructions to an application being executed on an owner device associated with the owner.

6. A system, comprising:
a camera configured to capture a first aerial image that includes a view of a real estate property; and
a property characteristic determination system comprising a processor configured to execute instructions that, when executed by the processor, cause the processor to:
identify the real estate property included in the first aerial image;
access a second aerial image from an aerial image database;
format the first aerial image or the second aerial image to align one or more physical features captured by the first aerial image and the second aerial image, wherein formatting the first aerial image or the second aerial image comprises automatically filtering noise from the first aerial image or the second aerial image to facilitate alignment of the one or more physical features captured by the first aerial image and the second aerial image;
determine one or more changes that have occurred to the real estate property based at least in part on a comparison of the first aerial image to the second aerial image; and
automatically adjust an insurance policy term for an insurance policy relating to the real estate property based at least in part on the one or more changes that have occurred to the real estate property.

7. The system of claim 6, wherein the instructions, when executed by the processor, cause the processor to:
receive data relating to one or more characteristics of the real estate property from one or more smart home devices associated with the real estate property; and
determine the one or more changes that have occurred to the real estate property based at least in part on the data relating to the one or more characteristics.

8. The system of claim 6, wherein the instructions, when executed by the processor, cause the processor to:
access data relating to one or more public records relating to the real estate property; and
determine the one or more changes that have occurred to the real estate property based at least in part on the data relating to the one or more public records relating to the real estate property.

9. The system of claim 6, wherein the instructions, when executed by the processor, cause the processor to:
access a supplemental image from an additional camera located in or around the real estate property; and
determine the one or more changes that have occurred to the real estate property based at least in part on the supplemental image.

10. The system of claim 6, wherein the instructions, when executed by the processor, cause the processor to:
determine a recommendation relating to the real estate property based at least in part on the first aerial image or the second aerial image; and
communicate the recommendation to an owner of the real estate property via provision of instructions to an application being executed on an owner device associated with the owner.

11. A method, comprising:
accessing, via a property characteristic determination system, a first aerial image from an aerial image database, wherein the first aerial image includes a first view of a real estate property;
receiving, via the property characteristic determination system, a second aerial image that includes a second view of the real estate property;
identifying, via the property characteristic determination system, the real estate property included in the first and second aerial images;
formatting, via the property characteristic determination system, the first aerial image or the second aerial image to align one or more physical features captured by the first and second aerial images, wherein formatting the first aerial image or the second aerial image comprises automatically filtering noise from the first aerial image or the second aerial image to facilitate alignment of the one or more physical features captured by the first aerial image and the second aerial image;
determining, via the property characteristic determination system, one or more changes that have occurred to the real estate property based at least in part on a comparison of the first aerial image to the second aerial image; and
automatically adjusting, via the property characteristic determination system, an insurance policy term for an insurance policy relating to the real estate property based at least in part on the one or more changes that have occurred to the real estate property.

12. The method of claim 11, comprising:
receiving, via the property characteristic determination system, data relating to properties of the real estate property from one or more smart home devices associated with the real estate property; and
determining, via the property characteristic determination system, the one or more changes that have occurred to the real estate property based at least in part on the data received from the one or more smart home devices associated with the real estate property.

13. The method of claim 11, comprising:
accessing, via the property characteristic determination system, data relating to one or more public records relating to the real estate property; and
determining, via the property characteristic determination system, the one or more changes that have occurred to the real estate property based at least in part on the data relating to the one or more public records relating to the real estate property.

14. The method of claim 11, comprising:
accessing, via the property characteristic determination system, a supplemental image from a camera located in or around the real estate property; and
determining, via the property characteristic determination system, the one or more changes that have occurred to the real estate property based at least in part on the supplemental image.

15. The method of claim 11, comprising:
determining, via the property characteristic determination system, a recommendation relating to the real estate property based at least in part on the second aerial image; and
communicating, via the property characteristic determination system, the recommendation to an owner of the real estate property via provision of instructions to an application being executed on an owner device associated with the owner.

16. The method of claim 1, wherein the one or more changes that have occurred to the real estate property include an addition or removal of one or more physical structures on the real estate property.

17. The system of claim 6, wherein the one or more changes that have occurred to the real estate property include an addition or removal of one or more physical structures on the real estate property.

18. The method of claim 11, wherein the one or more changes that have occurred to the real estate property include an addition or removal of one or more physical structures on the real estate property.

\* \* \* \* \*